United States Patent [19]

Wahl et al.

[11] 4,266,789

[45] May 12, 1981

[54] MACHINE TOOL CHUCK

[75] Inventors: Günter Wahl, Leinfelden-Echterdingen; Gerhard Kuhlmann, Stuttgart; Ernst Kränzler, Leinfelden-Echterdingen, all of Fed. Rep. of Germany

[73] Assignee: Robert Bosch GmbH, Stuttgart, Fed. Rep. of Germany

[21] Appl. No.: 934,482

[22] Filed: Aug. 17, 1978

[30] Foreign Application Priority Data

Sep. 7, 1977 [DE] Fed. Rep. of Germany ....... 2740202

[51] Int. Cl.³ .............................................. B23B 31/04
[52] U.S. Cl. ........................................ 279/60; 279/59; 279/64
[58] Field of Search ................. 279/1 Q, 1 W, 60, 64, 279/65, 56, 59

[56] References Cited

U.S. PATENT DOCUMENTS

| | | | |
|---|---|---|---|
| 2,553,990 | 5/1951 | Vidal | 279/1 Q X |
| 3,168,322 | 2/1965 | Dziedzik | 279/1 W X |
| 3,737,170 | 6/1973 | Wanner et al. | 279/60 |

*Primary Examiner*—Z. R. Bilinsky
*Attorney, Agent, or Firm*—Frishauf, Holtz, Goodman & Woodward

[57] ABSTRACT

A tool chuck, especially for holding tool bits, for example twist drills, and for use with a machine tool, in particular a portable electric drill. The chuck is so constructed as to permit secure holding of the tool bit even when used in percussion drills or impact hammer drills, while at the same time providing protection for the elastic internal element which provides axial movement. The tool chuck has a core or mandrel surrounded by a hollow conical collar which includes at least two chuck jaws and the elastic member is located between the core and the collar to apply an axial force between these two parts when the chuck is closed on a tool bit while being protected against direct exposure to the impacts sustained by the chuck jaws.

15 Claims, 6 Drawing Figures

MACHINE TOOL CHUCK

BACKGROUND AND PRIOR ART

The present invention relates to a tool chuck, especially for holding various tool bits, for example twist drill bits, so as to be driven by a machine tool, in particular a portable drill press. The machine tool may include a percussion feature and the tool bit may thus be additionally subjected to impact forces. The chuck to which the invention relates includes a core or mandrel on which moves a hollow collar with interior conical surfaces against which glide at least two chucking jaws. The chuck further includes an elastic member tending to urge the mandrel or core away from the surrounding collar. A chuck of this general type is known, for example from U.S. Pat. No. 3,737,170, Warner et al., (to which the German Disclosure Document DE-OS No. 1,957,289 corresponds), assigned to the assignee of this application. The chuck described there is to be used with impact drills for holding a tool bit securely against impact and oscillatory stresses which at the same time permitting a relatively easy release of the drill bit without the application of high forces.

A further known tool chuck is described in the German Disclosure Document No. 23 47 364 for use in impact or percussion drill service. It is a disadvantage of the known tool chucks that the elastic member which urges the mandrel and the chuck jaws apart is disposed immediately adjacent to the chuck jaws and is thus exposed to the effects of the impacts that the chuck jaws themselves are subjected to during the use of the tool.

THE INVENTION

It is an object of the invention to provide a tool chuck in which the elastic member which exerts relative forces between the mandrel or core on the one hand and the chuck jaws on the other hand is disposed in such a way as not to be subject to the direct impact forces experienced by chuck jaws. In this manner, the elastic member is protected from destructive influences and is better able to perform the function for which it is intended.

Briefly, the chuck includes a core or mandrel to be coupled to the power delivering shaft of the machine tool and a hollow collar with interior conical surfaces in which chuck jaws are placed. The clamping connection chain: tool bit-jaws-collar-core has, according to the invention, an elastic element interposed in such a manner that the collar clamps the jaws to the tool bit and the elastic element against the core. Thus, and as particular advantage of this construction, displacement of the chuck jaws toward the tool bit, i.e., away from the machine tool which rotates the chuck, causes a closure of the chuck jaws so that the manipulation of the chuck is made easy, especially when tool bits of small diameter are used. An auxiliary sleeve, forming a locking ring to which the collar is threaded, permits axial excursions.

In a particular embodiment of the invention, the core or mandrel has a flange the side adjacent the power shaft of which supports one side of the elastic member while the other side of the elastic member bears against an end face of a locking ring which surrounds the core. Threadedly coupled to the locking ring is the hollow collar within which are disposed the chuck jaws. Suitably, the locking ring may be provided with circumferential bevel gears that can be engaged by a beveled key for causing rotation of the locking ring and axial movement of the collar, thereby changing the free opening provided by the jaws for the admission of a tool bit, for example a drill bit.

In particular, the invention provides a tool chuck which holds the tool bit securely in percussion service but which may be locked and unlocked by means of a standard chuck key which is used to operate non-percussion type drills.

The invention will now be described in detail by way of several preferred examples with reference to the accompanying drawings wherein.

DETAILED DESCRIPTION OF THE INVENTION

Figure 1:
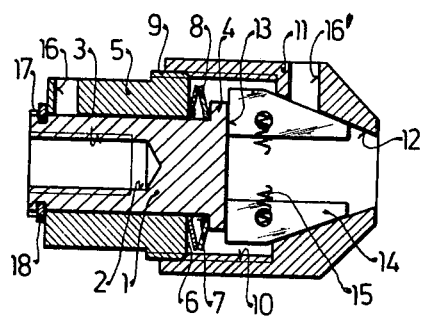
FIG. 1 is an axial section through a first exemplary embodiment of the invention.

The first exemplary embodiment of the tool chuck according to the invention as illustrated in FIG. 1 includes a core or mandrel 1, of substantially cylindrical shape and provided with a central, axial blind bore 2 having internal threads 3. The threaded bore 2/3 serves for mounting the core 1 on the drive shaft of a machine tool, not shown, for example a portable electric drill. The side of the chuck adjacent to the drive shaft of the machine tool will be referred hereinbelow as the driving side or driving end of the chuck while the front end of the chuck into which the tool bits are placed will be referred to as the tool bit side or end. At the tool bit end of the core 1 there is provided thereon a cylindrical flange 4. A cylindrical locking ring 5 forming an auxiliary sleeve is disposed surrounding the core 1 and capable of axial displacement thereon. Disposed between the end face 6 on the tool bit side of the locking ring 5 and the end face 7 nearest the drive shaft side of the flange 4 is a compression spring embodied in the present example as a double-cup spring 8. The tool bit end of the locking ring 5 has external threads 9 which engage internal threads 10 of a substantially cylindrical chuck collar 11 which extends over the workpiece end of the core 1. The end of the collar 11 adjacent to the drive shaft is a hollow cylinder with internal threads 10 whereas the part nearest the workpiece is embodied as a hollow cone 12. Located within the hollow cone 12 and resting on the end face 13 of the core 1 are three chuck jaws 14 which are forced apart by three helical springs 15 so as to make contact with both the end face 13 of the core 1 and the interior surface of the hollow cone 12. A radial bore 16 is disposed in the locking ring 5 and a bore 16' in the collar 11 for admitting a suitable adjustment pin. In the region of its drive shaft end, the core 1 has a groove 17 holding a snap ring 18 which prevents the locking ring 5 from sliding off the core 1 when the threads 9/10 are uncoupled.

In use, the tool chuck illustrated in FIG. 1 is mounted on the drive shaft of a suitable machine tool, for example a portable electric drill, by means of the threads 2/3. The operator then holds fast the locking ring 5 while rotating the collar 11 counterclockwise, thereby causing its displacement away from the drive shaft and in the direction of the workpiece. The compression springs 15 then force the chuck jaws 14 outwardly and the chuck opens. After the insertion of a tool bit, for example a twist drill, the collar 11 is rotated back onto the locking ring 5 until the chuck jaws 14 have made contact with the tool bit, whereafter a more forceful relative rotation of the collar 11 and the locking ring 5 may be performed by inserting two suitable pins into the radial bores 16, 16' thereby compressing the double-cup spring 8.

A tool bit fastened in this manner is now held securely even against the effects of percussion in a percussion drill or an impact drill. The small displacements of the parts of the chuck due to the percussion forces are absorbed by the cup springs and do not result in changing the forces that are exerted by the chuck jaws on the tool bit.

Figure 2:
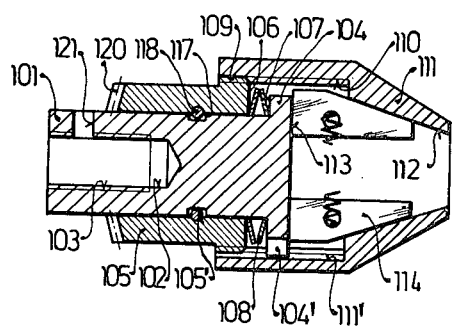
FIG. 2 is an axial section of a second exemplary embodiment of the invention.

In the second exemplary embodiment illustrated in FIG. 2, the tool chuck has a mandrel core 101 of substantially cylindrical shape and provided at the drive side with a central axial blind bore 102 having interior threads 103. The threaded bore 102/103 serves to couple the core 101 to the drive shaft of a power tool, for example a portable electric drill. The workpiece end of the core 101 is provided with a narrow cylindrical flange 104. Surrounding the core 101 is a cylindrical clamping or locking ring 105 which is able to both rotate and move axially. A compression spring embodied here as a double-cup spring 108 is disposed between the end face 106 of the locking ring 105 and the end face 107 of the flange 104 nearest the drive side of the core 101. In the region of the end of the locking ring 105 nearest the workpiece, there are provided thereon external threads 109 by means of which the locking ring engages the internal threads 110 of a substantially cylindrical collar 111 which extends beyond the end of the core 101 nearest the workpiece. The opposite part of the collar nearest the workpiece, the chuck jaws, as well as the springs urging the chuck jaws apart, are identical to those as already described with respect to FIG. 1 with the exception that no radial bores are provided for the insertion of adjustment pins.

The external cylindrical surface of the core 101 has a wide groove 117 cooperating with a narrow groove 105' in the internal cylindrical surface of the locking ring 105. The narrow groove 105' carries an externally elastic snap ring 118 which limits the axial displacement of the locking ring 105 with respect to the core 101 to the width of the wide groove 117 minus the width of the snap ring 118. The locking ring 105 must be able to undergo some displacement on the core 101 so as to permit a tensioning of the cup springs 108 when the chuck is tightened around a tool bit.

The internal threads 110 of the collar 111 are traversed by an axial longitudinal groove 111' which is engaged by a protrusion 104' which is integral with the flange 104. In this manner, the collar 111 and the core 101 are incapable of relative rotation. At the drive side end, the locking ring 105 is provided with a bevel gear 120 adjacent to which the core 101 has at least one radial bore 121 which serves for receiving the guiding pin of a chuck key, not shown. A complementary bevel gear on the chuck key engages the bevel gear 120 of the locking ring. When the key is inserted in the bore 121 and is rotated with respect to the core, the locking ring 105 is also rotated relative to the core 101 and hence also with respect to the collar 111. Accordingly, the distance between the interior cone 112 of the collar and the end face 113 of the core 101 changes and the chuck is either opened or closed.

Figure 3:
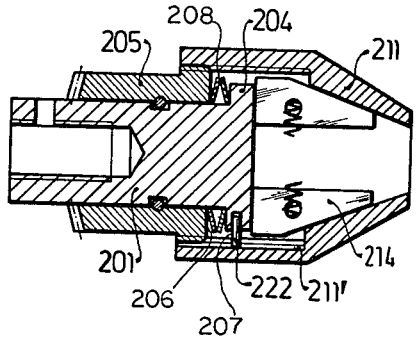
FIG. 3 is an axial section of a third embodiment of the invention.

A third exemplary embodiment of the invention is illustrated in FIG. 3 and is distinguished from the embodiment of FIG. 2 only by the fact that the relative rotation between the core 201 and the collar 211 is prevented in this embodiment by a pin 222 which is inserted in the flange 204 of the core 201 and which engages an internal longitudinal groove 211' within the collar 211. The cup springs 208 are positioned similarly to springs 108, FIG. 2.

Figure 4:
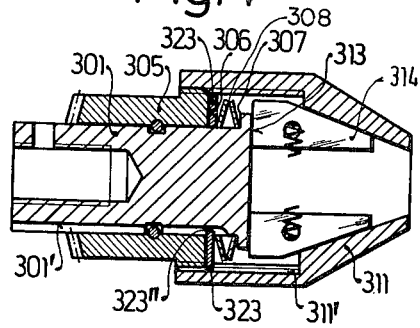
FIG. 4 is an axial section of a fourth embodiment of the invention.

A fourth exemplary embodiment of the invention is illustrated in FIG. 4, and is distinguished from the embodiments of FIGS. 2 and 3 only in that the relative rotation of the collar 311 and the core 301 is prevented in this embodiment by a guide disc 323 which is loosely located between the end face 306 of the locking ring 305 and the cup spring 308 and which has a radial tooth 323 engaging an internal groove 311' in the collar 311 and further has a radially inward pointing tooth 323" which engages an external groove 301' in the core 301 in parallel to the axis thereof.

Figure 5:
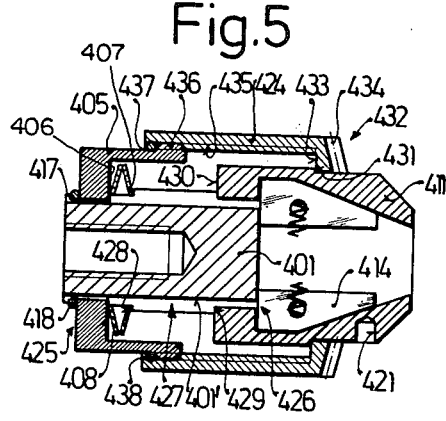
FIG. 5 is an axial section of a fifth embodiment of the invention.

FIG. 5 illustrates an example of a fifth embodiment of a tool chuck according to the invention. In this embodiment, there is again provided a mandrel or core 401, a collar 411, chuck jaws 414, a locking ring 405 and cup springs 408 and, in addition thereto and in contrast to the previous embodiments, a locking sleeve 424. These elements are associated in the following manner:

The core 401 has substantially cylindrical shape. Provided on its outer circumference is a number of axial and mutually parallel longitudinal grooves 401'. The drive side end 425 and the end 26 nearest the tool bit or workpiece are of somewhat smaller diameter than the central part 427 of the core 401 and, accordingly, there is defined a first shoulder 428 and, at the end adjacent to the workpiece, a second shoulder 429. The end 425 adjacent to the drive shaft carries a locking ring 405 which is supported on the shoulder 428 across the cup springs 408. The locking ring has extensions, not shown, which engage the longitudinal groove 401' and is thus prevented from rotating relative to the core 401. An external groove 417 of the core 401 carries an internally elastic snap ring 418 which limits the axial displacement of the locking ring 405 in the direction of the drive means. The collar 411 slides over the part 426 of the core 401 and is prevented from rotating relative thereto by extensions, not shown, which engage the longitudinal groove 401'. The end face 430 of the collar 411 is supported by the shoulder 429 which lies between the median part 427 and the end 426 of the core 401. The part of the collar 411 adjacent to the drive means is substantially cylindrical and is provided with a step 431 which supports the internal surface 433 of a flange 432 belonging to the hollow cylindrical locking sleeve 424. The side of the flange 432 adjacent to the workpiece is provided with a bevel gear 434. In the vicinity of the bevel gear, the cylindrical outer surface of the collar 411 is provided with several radially cylindrical holes 421 which serve to receive the guide pin of a chuck key, not shown. The bevel gear of the chuck key engages the bevel gear 434 of the locking sleeve and rotates the latter with respect to the chuck collar 411.

The locking sleeve 424 is provided with internal threads 435 which engage external threads 436 of the locking ring 405. If the locking sleeve 424 is now rotated with respect to the collar 411 by means of the chuck key, the threads 435/436 cause an axial relative displacement of the collar with respect to the core due to the fact that the collar, the core and the locking ring are prevented from mutual rotation. The back-and-forth movement of the collar causes a relative opening or closing of the chuck jaws 414. An elastic snap ring 438 inserted in an internal groove 437 of the locking sleeve 424 limits the axial displacement of the locking sleeve with respect to the locking ring in the direction of the workpiece and thus prevents the separation of these two parts even if their threads are fully disengaged.

Figure 6:
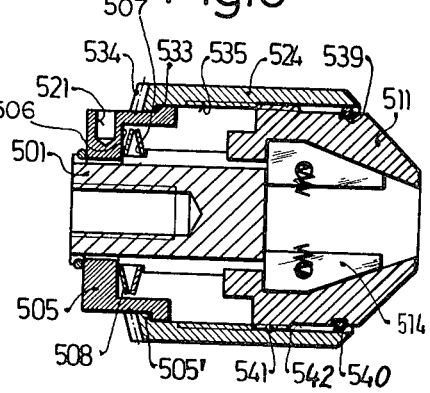
FIG. 6 is an axial section of a sixth embodiment of the invention.

The sixth embodiment of the invention illustrated in FIG. 6 represents a kinematic inversion with respect to the embodiment of FIG. 5. In particular, the locking sleeve 524 is coupled to the locking ring 505 by means of a stop 533 and to the collar 511 by internal threads 535 which engage the external threads 541 of the collar. The cooperating threads 535, 541 are relatively close to the location of the workpiece and are subject to soiling against which they are protected by the presence of an O-ring 540 disposed in an O-ring groove 539 in the cylindrical part of the collar 511. The elastic O-ring bears against a smooth internal cylindrical surface 542 of the locking sleeve 524 to provide sealing and yet permit relative motion. The drive side end of the locking sleeve is provided with a bevel gear 534 which engages a complementary bevel gear on a chuck key, not shown. Radial bores 521 in the locking ring 505 are intended to receive the alignment pin of the chuck key, which, when rotated, rotates the locking sleeve with respect to the locking ring and hence also with respect to the collar 511, thereby causing its axial displacement and opening or closure of the internal chuck jaws.

Various changes and modifications may be made and features described in connection with any one of the embodiments may be used with any of the others within the scope of the inventive concept.

We claim:

1. A tool chuck for use with a power tool to clamp tool bits, having rotary driving means and which, additionally, place axially reciprocating forces on the chuck, comprising:
    a mandrel core (1, 101, 201, 301, 401, 501) for attachment to the rotary driving means of the power tool;
    a hollow collar (11, 111, 211, 311, 411, 511) partially coaxially surrounding said core, said collar having an interior at least partially conical surface and an enlarged portion surrounding the mandrel core;
    at least two chuck jaws (14, 114, 214, 314, 414, 514) disposed in relatively movable configuration at least partially within the hollow interior of said collar being confined radially by said conical surface thereof and longitudinally supported by said mandrel core;
    means (5, 105, 205, 305, 405, 505) longitudinally slidable with respect to the mandrel core coupling the mandrel core and the hollow collar; and
    a compressible elastic member (8, 108, 208, 308, 408, 508) bearing against the core and said slidable means tending to move the collar toward the core, and being compressed upon tightening movement of the collar, and hence of the jaws therein against a tool bit;
    said core, slidable means, elastic member, collar, and jaws, together with the tool bit clamped in the jaw forming a clamping connection chain, to permit tightening of the jaws, upon relative longitudinal movement of the hollow collar and longitudinal slidable movement of the slidable means against the force of the compressible elastic member, and additionally introduce the force of the compressible elastic member in the tightening force exerted by the jaws and thus hold the jaws securely even under impact conditions from the mandrel core to the jaws.

2. A tool chuck according to claim 1, wherein said elastic means (8, 108, 208, 308, 408, 508) is at least one cup spring.

3. A tool chuck according to claim 2, wherein the slidable means comprises
    a locking ring (5, 105, 205, 305) surrounding the mandrel core, said locking ring having an end face (6, 106, 206, 306) near said chuck jaws, for giving one-sided support to said elastic member (8, 108, 208, 308), the other side of said elastic member being supported by an end face (7, 107, 207, 307) near the drive side of said core, and wherein said locking ring (5, 105, 205, 305) has external threads (9, 109, 209, 309) cooperating with complementary threads (10, 110, 210, 310) on said collar (11, 111, 211, 311) for variable threaded engagement of said locking ring and said collar.

4. A tool chuck according to claim 3, wherein said locking ring (5) and said collar (11) are provided with complementary means (16) for imparting relative torque therebetween.

5. A tool chuck according to claim 4, wherein said means (16) are radial holes (16) for receiving torque-imparting pins.

6. A tool chuck according to claim 3, including rotation-preventing means (104', 111'; 222, 211'; 323; 323', 311'; 323", 301') for preventing rotation between said core (101, 201, 301) and said collar (111, 211, 311) and wherein said locking ring (105, 205, 305) is provided with a bevel gear (120, 220, 320) at its end near said driving means and wherein said core (101, 201, 301) is provided with at least one radial depression (121, 221, 321) for receiving an alignment pin of a chuck key for engaging said bevel gear.

7. A tool chuck according to claim 6, wherein said means for preventing rotation is an internal groove (111', 211', 311') parallel to the axis and in the internal surface of said collar (111, 211, 311) slidably engaged by an extension (104', 222, 323') integral with said core (101, 201, 301).

8. A tool chuck according to claim 7, wherein the extension comprises a radial protrusion (104') from the core (101) which engages an internal groove (111') of the collar (111).

9. A tool chuck according to claim 7, wherein the extension comprises a radial pin (222) inserted in the flange (204) of the core (201) for engaging the internal groove (211') of the collar (211).

10. A tool chuck according to claim 7, wherein the outer surface of the core (301) is provided with an axially parallel groove (301') and further including an annular disc (323) disposed between the end face (306) of the locking ring (305) near the end face of the core (301), said annular disc (323) having extensions (323", 323') which respectively engage an external groove (301') in said core (301) and the internal groove (311') of the collar (311).

11. A tool chuck according to claim 1, wherein said elastic member (8, 108, 208, 308, 408, 508) is constituted of two parallel cup springs.

12. A tool chuck according to claim 2, wherein the slidable means comprises an auxiliary sleeve (405, 505) surrounding the mandrel core (401, 501);

a locking sleeve (424, 524) coaxial with and partially surrounding said auxiliary sleeve and said collar (411, 511), said auxiliary sleeve being axially slidable, but non-rotatable, relative to said core and being telescoped with respect to said locking sleeve;

and coupling means (424, 431, 435, 436; 505', 524, 535, 541) on said locking sleeve (424, 524) and, respectively, on said auxiliary sleeve (405, 505) and on said collar (411, 511) to couple the collar to the auxiliary sleeve and hence to the mandrel core, with the elastic member (408, 508) interposed in the clamping chain formed by the core-auxiliary sleeve and locking sleeve-collar-and jaws therein together with the tool bit.

13. A tool chuck according to claim 12, wherein the locking sleeve (424) has internal threads (435);

the auxiliary sleeve (405) has external threads (436) thereon;

and wherein the coupling means comprises shoulder-and-abutment means between the locking sleeve and the collar and includes a vertical surface (433) on the locking sleeve (424) disposed at the end of the locking sleeve near the chuck jaws and facing the drive means, and bearing against a complementary radial surface (431) formed on the collar (411);

a bevel gear (434) formed on the locking sleeve;

and a radial cylindrical bore (421) formed in the collar to receive a guide pin of a chuck key.

14. A tool chuck according to claim 12, wherein the locking sleeve (524) is formed with internal threads (535);

the collar (511) is formed with external threads (541);

the coupling means comprises a shoulder-and-abutment means which includes a vertical surface (533) on the locking sleeve (524) and disposed at its end near said driving means and facing said chuck jaws, and a complementary vertical surface (505') on the auxiliary sleeve (505);

a bevel gear (534) formed on the locking sleeve (524) adjacent the end near said drive means;

and at least one radial cylindrical bore (521) formed in the auxiliary sleeve (505) adjacent the end of the locking sleeve (524) to receive a guide pin of a chuck key to rotate the bevel gear of said locking sleeve and, by engagement of said threads on the collar (511) and on the locking sleeve, to move the collar with respect to said mandrel core.

15. A tool chuck according to claim 2, wherein the slidable means comprises an auxiliary sleeve (5, 105, 205, 305) surrounding the mandrel core (1, 101, 201, 301), axially slidable and rotatable with respect thereto, said sleeve being telescoped with respect to the hollow collar (11, 111, 211, 311) and in threaded engagement therewith.

* * * * *